United States Patent [19]

Tanaka et al.

[11] Patent Number: 5,559,620
[45] Date of Patent: Sep. 24, 1996

[54] ANTI-FERROELECTRIC LIQUID CRYSTAL DISPLAY DEVICE WITH INTERSECTING ALIGNMENT FILM DIRECTIONS

[75] Inventors: Tomio Tanaka, Hachioji; Katsuhito Sakamoto, Yokohama, both of Japan

[73] Assignee: Casio Computer Co., Ltd., Tokyo, Japan

[21] Appl. No.: 405,177

[22] Filed: Mar. 9, 1995

Related U.S. Application Data

[63] Continuation of Ser. No. 25,080, Mar. 2, 1993, abandoned.

[30] Foreign Application Priority Data

| Mar. 5, 1992 | [JP] | Japan | 4-048499 |
| Mar. 5, 1992 | [JP] | Japan | 4-048501 |
| Jun. 17, 1992 | [JP] | Japan | 4-158276 |

[51] Int. Cl.$^6$ .................. G02F 1/141; C09K 19/02
[52] U.S. Cl. .................................. 359/78; 359/100
[58] Field of Search .................... 359/75, 78, 100

[56] References Cited

U.S. PATENT DOCUMENTS

| 4,662,721 | 5/1987 | Harada et al. | 359/77 |
| 5,108,650 | 4/1992 | Koden et al. | 359/103 |
| 5,192,596 | 3/1993 | Hanyu et al. | 359/78 |
| 5,200,846 | 4/1993 | Hiroki et al. | 359/59 |
| 5,204,766 | 4/1993 | Taniguchi et al. | 359/100 |
| 5,214,523 | 5/1993 | Nito et al. | 359/78 |

OTHER PUBLICATIONS

Yamamoto et al., "Switching Properties in Antiferroelectric Liquid Crystals", Japanese Journal of Applied Physics, vol. 30, No. 9b, Sep. 1991, pp. 2380–2383.
Yamawaki et al, "Electro-optical . . . Liquid crystal cells", Japan Display, 1989, pp. 26–29.

*Primary Examiner*—William L. Sikes
*Assistant Examiner*—Ron Trice
*Attorney, Agent, or Firm*—Frishauf, Holtz, Goodman, Langer & Chick

[57] ABSTRACT

An anti-ferroelectric liquid crystal device includes a first substrate on which pixel electrodes and an alignment film are formed, and a second substrate on which an opposite electrode and another alignment film are formed. These substrates are arranged to face each other. An anti-ferroelectric liquid crystal is sealed in a space defined between the substrates. The pixel electrodes arranged on the first substrate are connected to thin-film transistors formed on the first substrate. The thin-film transistors are selected by being supplied with control signals at their gates and data signals are supplied to their drains to apply data potentials to the pixel electrodes.

10 Claims, 6 Drawing Sheets

FIG.5C
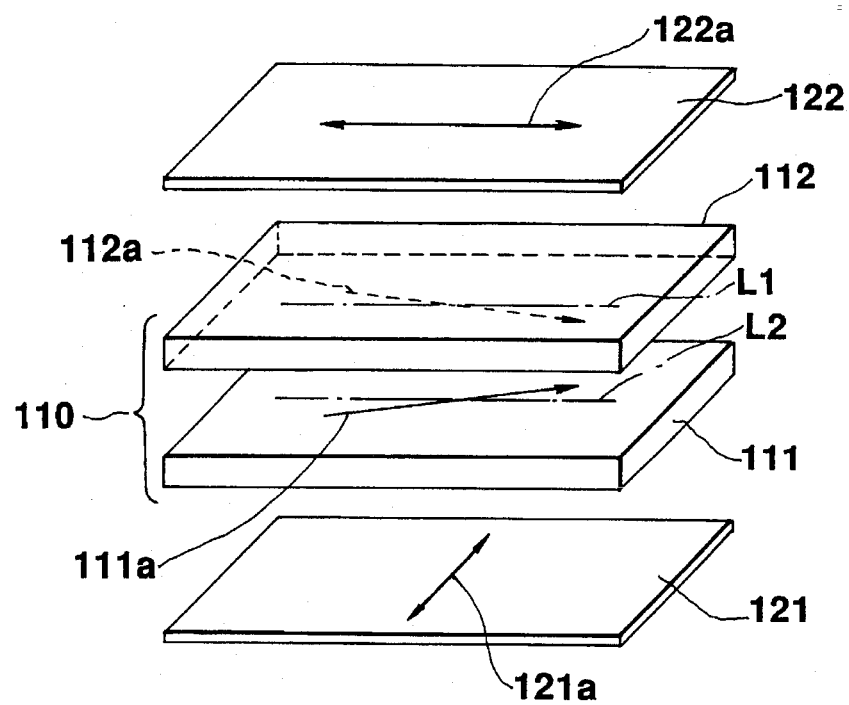
FIG.6
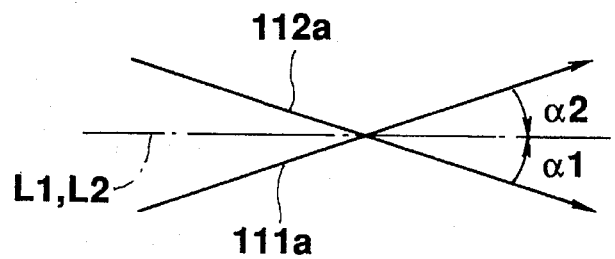
FIG.7

1

ANTI-FERROELECTRIC LIQUID CRYSTAL DISPLAY DEVICE WITH INTERSECTING ALIGNMENT FILM DIRECTIONS

This application is a continuation of application Ser. No. 08/025,080, filed Mar. 2, 1993, now abandoned.

BACKGROUND OF THE INVENTION

1. Field of the Invention

The present invention relates to an anti-ferroelectric liquid crystal display (LCD) device.

2. Description of the Related Art

An anti-ferroelectric LCD device uses a stability of a molecular orientation of an anti-ferroelectric liquid crystal. A simple-matrix type anti-ferroelectric LCD device has been known.

FIGS. 8 and 9 show a structure of the anti-ferroelectric LCD device. A pair of transparent substrates (glass plates or the like) 1 and 2 are arranged to face each other with a liquid crystal layer being interposed therebetween. A plurality of parallel scan electrodes (transparent electrodes) 3 are formed on one substrate 1, and a plurality of parallel signal electrodes (transparent electrodes) 4 are formed on the other substrate 2 to intersect at right angles with longitudinal axis of the scan electrodes 3.

Alignment films 5 and 6 are provided on electro-deformation surfaces of both substrates 1 and 2. These alignment films 5 and 6 are homogeneous alignment films made of an organic high molecular compound such as polyimide. The film surfaces of the alignment films 5 and 6 are subjected to aligning treatment by rubbing them in a mutually parallel direction.

The substrates 1 and 2 are bonded to each other at their peripheral portions with a frame-shaped sealing member (not shown) being interposed therebetween. An anti-ferroelectric liquid crystal 7 is sealed in a space defined by the sealing member between the substrates 1 and 2. The anti-ferroelectric liquid crystal 7 has a smectic layer structure formed by a plurality of smectic layers laminated each other and has a stability in molecular orientation. The liquid crystal molecular orientation is varied in accordance with an electric field.

Liquid crystal molecules of the anti-ferroelectric liquid crystal 7 are orientated at a certain tilt angle to a normal line of the smectic layer structure. As is shown in FIGS. 5A to 5C, there are three stable states of the molecular orientation.

FIG. 5A shows the=first stable state in which a strong electric field is applied in one direction to the liquid crystal layer. In this state, a spontaneous polarization of each of the liquid crystal molecules acts the electric field, so that all liquid crystal molecules are uniformly orientated in one direction at a tilt angle θ to the normal line L of the smectic layer structure.

FIG. 5C shows the second stable state in which a strong electric field is applied in the opposite direction to the liquid crystal layer. In this state, the spontaneous polarization of each of the liquid crystal molecules acts the opposite-directional electric field, and the liquid crystal molecules are inverted. Thus, all liquid crystal molecules are uniformly orientated in a direction opposite to the direction in the case of the first stable state, at the tilt angle θ to the normal line L of the smectic layer structure.

FIG. 5B shows the third stable state in which no electric field or a weak electric field is applied. In this state, the liquid crystal molecules are orientated in alternate directions in the order of layers (i.e. in alternate directions at the same tilt angle θ to the normal line L of the smectic layer structure). Therefore, an average orientation direction of all of the liquid crystal molecules in the liquid crystal layer is in the normal line of the smectic layer structure.

The orientation directions of the liquid crystal molecules of the anti-ferroelectric liquid crystal 7 is restricted by the alignment films 5 and 6 of the substrates 1 and 2. Thus, in the above described third stable state, the average orientation direction of the liquid crystal molecules is in accordance with a direction determined by the aligning treatments (rubbing) of the alignment films 5 and 6. In the first and third stable states, molecular longitudinal axises of all of the liquid crystal molecules are inclined by the tilt angle θ to the normal line L of the smectic layer structure orientated in the third stable state.

Polarizing plates 8 and 9 are laminated on the outer surfaces of the substrates 1 and 2, respectively. The polarizing plates 8 and 9 are arranged in a cross-Nicol arrangement so that their light transmission axes intersect with each other at substantially right angles. The transmission axis of one of the polarizing plates, e.g. the lower incidence-side polarizing plate 8 in FIG. 8, is substantially parallel to the average orientation direction of the liquid crystal molecules in the third stable state.

FIG. 10 shows an equivalent circuit of the above-described LCD device. A pixel, constituted by the mutually facing intersection portion of one of the scan electrodes 3 of one substrate 1 and one of the signal electrodes 4 of the other substrate 2 and the anti-ferroelectric liquid crystal 7 interposed between the intersection portion, is equivalent to a capacitor. Thus, the equivalent circuit of the LCD device is expressed by a circuit in which each of the scan electrodes 3 and each of the signal electrodes 4 are coupled by a capacitance CLC of the pixel (hereinafter referred to as "pixel capacitance").

A display operation of the above LCD device will now be described. When no voltage or a low voltage is applied across the electrodes 3 and 4 of the substrates 1 and 2, the liquid crystal molecules are orientated in the third stable state. In the third stable state, a direction of a linear-polarized light which has passed through the incidence-side polarizing plate 8 is substantially identical to the average orientation direction of the liquid crystal molecules. Thus, the linear-polarized light emanates from the liquid crystal layer structure and is shielded by the output-side polarizing plate 9 arranged in the cross-Nicol arrangement. Accordingly, in this case, light is hardly emitted from the LCD device, and the display is set in the OFF (dark) state.

On the other hand, when an ON voltage of one-directional polarity (higher than a threshold voltage of the liquid crystal) is applied across the electrodes 3 and 4 of the substrates 1 and 2, the liquid crystal molecules are orientated in the first stable state. In this first stable state, the longitudinal axes of the liquid crystal molecules are displaced by almost the same angle as the aforementioned tilt angle with respect to the direction of the linear-polarized light which has passed through the incidence-side polarizing plate 8. Thus, the linear-polarized light made incident on the liquid crystal layer is converted to an elliptic-polarized light by a birefringence effect of the liquid crystal layer, and a component of the elliptic-polarized light, which travels in the light transmission direction of the output-side polarizing plate 9, emanates from the liquid crystal device. Accordingly, the display is set in the ON (light) state.

The above description is also applicable to a case where an ON voltage of an opposite-directional polarity is applied across the electrodes 3 and 4 of substrates 1 and 2. In this case, the liquid crystal molecules are orientated in the second stable state. In the second stable state, too, the linear-polarized light made incident on the liquid crystal layer structure is converted to the elliptic-polarized light by the birefringence effect of the liquid crystal layer, and the component of the elliptic-polarized light, which travels in the transmission direction of the output-side polarizing plate 9, emanates from the liquid crystal device. Accordingly, the display is set in the ON (light) state.

FIG. 11 illustrates a typical relationship between the voltage v applied across the electrodes 3 and 4 and a light transmittance TO in the above-described anti-ferroelectric LCD device. When the applied voltage v is close to 0 V, the light transmittance TO is low, and the LCD device is in the OFF state. When the applied voltage T is increased beyond a threshold value, the light transmittance TO increases and the liquid crystal device is set in the ON state. When the applied voltage V is decreased from the value in this state and reaches below a certain threshold value which is lower than the threshold value of the ON state, the light transmittance TO decreases and the liquid crystal device becomes to the OFF state. This applies to a case where the applied voltage V is varied to the (–) side. In this case, too, when the absolute value of the applied voltage rises beyond a certain threshold value, the LCD device is set in the ON state. When the absolute value of the applied voltage is decreased from the value in this state and is reached at a certain threshold value below the threshold value relating to the ON state, the LCD device is returned to the OFF state.

Accordingly, images can be displayed on the LCD device in the following manner: voltage values +VB and –VB (FIG. 11), which are almost intermediate values between the voltage value at which the LCD device is set in the ON state and the voltage value at which the display device is returned to the OFF state, are employed as reference voltage values, and drive voltages obtained by superposing image data signals on the reference voltages +VB and –VB are applied across the electrodes 3 and 4.

FIG. 12 shows a relationship between a waveform of a drive voltage VLC, applied across the electrodes 3 and 4 of one of the pixels of the LCD device and a light transmittance T of the pixel. In FIG. 12, "TS" denotes a pixel selection time period. The time period "TS" is obtained by equally dividing one frame "TF" associated with one screen by the number of rows of pixels (i.e. the number of scan electrodes).

If a voltage much higher than the reference voltage VB is applied across the electrodes 3 and 4 of the selected pixel in the first selection time period "TS", the liquid crystal molecules are orientated in the aforementioned first stable state. Thus, the pixel is set in the ON (light) state. In a non-selection time period following the selection time period "TS", the potential of the scan electrode 3 of this pixel becomes a non-selection potential, but a data signal for driving a pixel in another selected row but in the same column as that of the pixel in the non-selection time period is applied to the signal electrode 4. Thus, a voltage of a waveform corresponding to the data signal is applied to the pixel in the non-selection time period. However, since the potential of the scan electrode 3 of the pixel in the non-selection time period is a non-selection potential during the non-selection time period, the voltage applied to the pixel during the non-selection time period is in the vicinity of +VB and a high voltage is not applied. Accordingly, the first stable state of the liquid crystal molecule orientation does not change to another stable state, although the light transmittance varies slightly owing to slight motion of liquid crystal molecules.

Suppose that a voltage ((–) voltage), whose polarity is opposite to that of the voltage in the previous selection time period, has been applied across the electrodes 3 and 4 of the selected pixel in the next selection time period "TS". In this case, the orientation state of the liquid crystal molecules is changed from the first stable state to another stable state. When the absolute value of the applied voltage is smaller than the reference voltage VB, as shown in FIG. 12, the orientation state of the liquid crystal molecules is not inverted to the second stable state but is set in the third stable state. Thus, the pixel is set in the OFF (dark) state. In the non-selection time period, as stated above, a voltage of a waveform corresponding to the data signal for driving a pixel of another row is applied. However, since the voltage applied during the non-selection time period is in the vicinity of –VB and a high voltage is not applied. Accordingly, the third stable state of the liquid crystal molecule orientation does not change to another stable state, although the light transmittance varies slightly owing to slight motion of liquid crystal molecules.

In addition, when a (–) voltage whose absolute value is much higher than the reference voltage VB is applied across the electrodes 3 and 4 of the selected pixel, the liquid crystal molecules are orientated in the second stable state and the pixel is set in the ON (light) state. Further, when a (+) voltage whose absolute value is smaller than the reference voltage VB is applied, the liquid crystal molecules are orientated in the third stable state and the pixel is set in the OFF (dark) state.

In this anti-ferroelectric LCD device, the liquid crystal molecules retain one of the first, second and third stable states until an electric field to change the orientation state is applied. Thus, the display with higher contrast can be obtained, as compared to generally employed TN mode or STN mode liquid display devices. Moreover, a time-sharing driving with high duty may be possible, realization of the LCD device with a high precision and a large screen can be expected.

The currently known anti-ferroelectric liquid crystals, however, have a problem that a response time to electric field is long. In addition, since the conventional anti-ferroelectric LCD device is of the simple matrix type, as mentioned above, a frame frequency for writing one screen cannot be increased.

The reason for this is that, in the simple matrix type LCD device, the electric field to change the orientation state of the liquid crystal molecules is applied to the liquid crystal during only the selection time period of each pixel, and therefore to set the pixel in the ON state or OFF state must be completed within the pixel selection time period.

More specifically, in the simple matrix type LCD device, the electric field to change the liquid crystal molecule orientation state acts on the liquid crystal during only the selection time period. Thus, unless the change of the liquid crystal molecule orientation state is completed within the selection time period, the setting of the pixel in the ON or OFF state becomes defective and image display cannot be effected.

Under these circumstances, in the conventional anti-ferroelectric LCD device, the selection time period of the pixels of each row needs to be set to a time period necessary for the change of the liquid crystal molecular orientation state. However, the response time to electric field is long in the anti-ferroelectric liquid crystal, and if the selection time period is set according to the response time of the anti-ferroelectric liquid crystal, the frame frequency becomes less than a practical value and high duty time sharing driving is not achieved.

Furthermore, in the conventional anti-ferroelectric LCD device wherein the aligning treatment directions of the alignment films of substrates 1 and 2 of the liquid crystal cell are parallel to each other, a light leak amount (i.e., amount of light not absorbed by the emission-side polarizing plate and emanating therefrom) in the OFF state is large. Consequently, the light/dark contrast is not good.

SUMMARY OF THE INVENTION

The present invention has been made in order to solve the above problems, and its object is to provide an anti-ferroelectric liquid crystal display device which can be driven in a high duty time sharing manner with high contrast.

In order to achieve the above object, there is provided an anti-ferroelectric liquid crystal display device characterized in that a first substrate, on which a plurality of pixel electrodes arranged in rows and columns, active elements connected to the pixel electrodes, a plurality of signal lines for supplying control signals and data signals to the active elements, and a first alignment film covering at least the surfaces of the pixel electrodes are mounted, and a second substrate, on which at least one opposite electrode opposed to the pixel electrodes and a second alignment film covering the opposite electrode, are arranged to face each other with a predetermined gap being interposed therebetween, and that an anti-ferroelectric liquid crystal with three orientation stable states is sealed in the gap defined between the first substrate and the second substrate by means of a sealing member. Thus, an active matrix type liquid crystal display device using anti-ferroelectric liquid crystal is constituted.

According to this characteristic feature of the invention, even if the anti-ferroelectric liquid crystal with low response speed is used, a voltage is applied to each pixel by turning-on of the active elements, and the applied voltage is retained by turning-off of the active elements. Thus, the time period for selecting one pixel can be shortened and the frame frequency can be increased, and thereby a high duty time sharing operation can be achieved. Since the liquid crystal molecules can surely be orientated in any one of the three stable states, the contrast of display is enhanced.

According to this invention, thin-film transistors formed on an insulated substrate and each having a predetermined shape are employed as active elements, and amorphous silicon is used for the thin-film transistors. Alignment films are formed on the inside surfaces of a pair of mutually facing substrates. At least the alignment film of the substrate on which the active elements are not formed is subjected to an aligning treatment in a predetermined direction. A rubbing method is used for the aligning treatment. When both alignment films on the inside surfaces of the mutually facing substrates are subjected to the aligning treatment, it is desirable that the first and second alignment films be subjected to the aligning treatment in different directions, such that a first aligning treatment direction of the first alignment film and a second aligning treatment direction of the second alignment film differ from each other, thereby making a normal line direction of a smectic layer structure of the anti-ferroelectric liquid crystal aligned by the first aligning treatment substantially parallel to a normal line direction of a smectic layer structure of the anti-ferroelectric liquid crystal aligned by the second aligning treatment.

In addition, according to the liquid crystal display device of the present invention, a pair of polarizing plates are arranged on the outer surfaces of the mutually facing substrates so as to sandwich these substrates. The light transmission axis of one of the pair of polarizing plates is arranged substantially parallel or perpendicular to the normal line of the smectic layer of the anti-ferroelectric liquid crystal aligned in accordance with the aligning treatment direction of the second alignment film of the adjacent second substrate, and the light transmission axis of the other polarizing plate is arranged substantially perpendicular to the light transmission axis of the above described one of the polarizing plates.

Furthermore, according to the liquid crystal display device of the present invention, alignment films for aligning the anti-ferroelectric liquid crystal in a predetermined direction are formed on the inside surfaces of a pair of mutually facing substrates. A first aligning treatment direction of one of the alignment films and a second aligning treatment direction of the other alignment film are different from each other, thereby making a normal line direction of a smectic layer structure of the anti-ferroelectric liquid crystal being adjacent to one of the alignment films and aligned by the first aligning treatment substantially parallel to a normal line direction of a smectic layer structure of the anti-ferroelectric liquid crystal being adjacent to the other of the alignment films and aligned by the second aligning treatment.

According to the above characteristic feature of the invention, the smectic layer structure of the anti-ferroelectric liquid crystal aligned by an orientation restriction force of the alignment film of one of the substrates coincides with the smectic layer structure of the anti-ferroelectric liquid crystal aligned by an orientation restriction force of the alignment film of the other substrate, and a uniform aligning state is obtained in the entire thickness of the liquid crystal between the substrates. As a result, according to the anti-ferroelectric liquid crystal display device of the invention, the amount of leak light is small when the anti-ferroelectric liquid crystal is orientated in the third stable state, and the contrast of display is enhanced.

The liquid crystal display device of this invention is applicable to not only the active matrix type liquid crystal display device but also to a simple matrix type liquid crystal display device. Like the above-described anti-ferroelectric liquid crystal display device, a pair of polarizing plates are arranged on the outer surfaces of the mutually facing substrates so as to sandwich these substrates, and the light transmission axis of one of the pair of polarizing plates is arranged substantially parallel or perpendicular to a normal line of a smectic layer structure of the anti-ferroelectric liquid crystal aligned in accordance with the aligning treatment direction of the second alignment film of the adjacent second substrate, and the light transmission axis of the other polarizing plate is arranged substantially perpendicular to the light transmission axis of the above described one of the polarizing plates.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 5A to 5C are diagrams showing three orientation stable states of the anti-ferroelectric liquid crystal;

FIG. 6 is an exploded perspective view showing a schematic structure of an anti-ferroelectric LCD device according to a second embodiment of the invention;

FIG. 7 is a view for showing aligning treatment directions in the second embodiment of FIG. 6;

DETAILED DESCRIPTION OF THE PREFERRED EMBODIMENTS

[First Embodiment]

Figure 1:
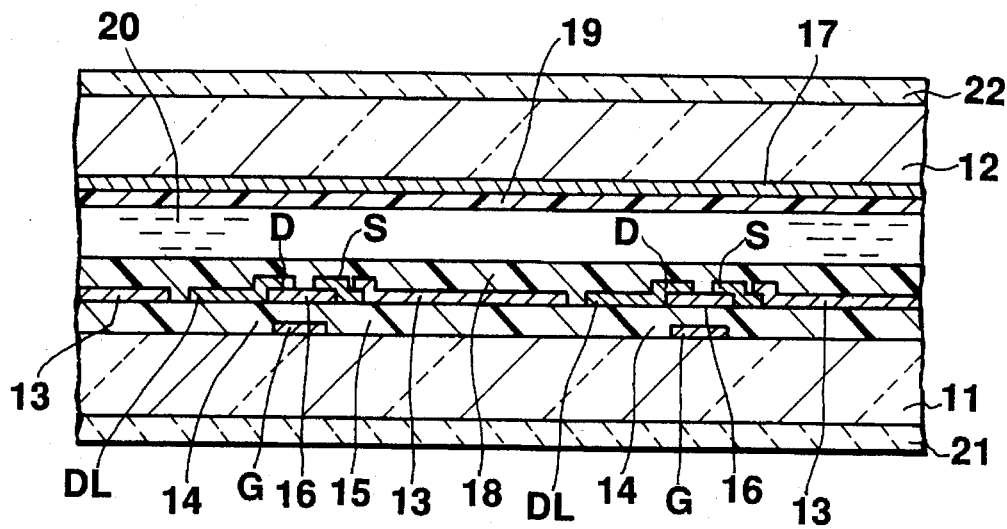
FIG. 1 is a cross-sectional view showing a part of an anti-ferroelectric liquid crystal device according to a first embodiment of the present invention.
Figure 2:
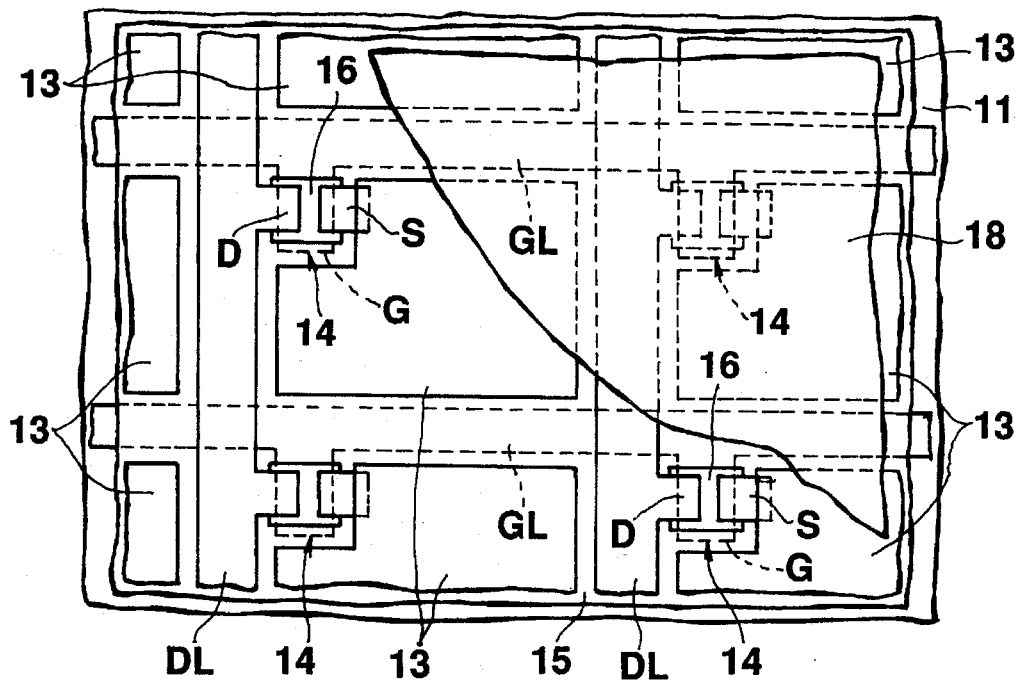
FIG. 2 is a partly cut-out plan view of a part of the anti-ferroelectric liquid crystal device shown in FIG. 1.

A first embodiment of the present invention will now be described with reference to FIGS. 1 to 4. FIG. 1 is a cross-sectional view showing a part of an anti-ferroelectric liquid crystal device, and FIG. 2 is a plan view of a part of a substrate on which pixel electrodes and active elements are formed.

The anti-ferroelectric LCD device according to this embodiment is an active matrix LCD device having thin-film transistors (TFT) as active elements. A pair of transparent substrates 11 and 12 are faced to each other and sandwich a liquid crystal layers, therebetween. Transparent pixel electrodes 13 and TFTs 14 or active elements connected to the pixel electrodes 13 are arranged in a matrix on the lower substrate (hereinafter referred to as "TFT substrate") 11, shown in FIG. 1.

The TFT 14 has, for example, an inverted stagger structure. Specifically, the TFT 14 is composed of a gate electrode G formed on the substrate 11, a gate insulating film 15 of SiN (silicon nitride) or the like covering the gate electrode G, a semiconductor layer 16 of a-Si (amorphous silicon) formed on the gate insulating film 15, and a source electrode S and a drain electrode D formed on the semiconductor layer 16.

Gate lines GL are formed between rows of the pixel electrodes 13 on the TFT substrate 11, and data lines DL are formed between columns of the pixel electrodes 13. The gate electrodes G of the TFTs 14 are connected to the gate lines GL, and the drain electrodes D are connected to the data lines DL. The gate lines GL, except their terminal portions (not shown), are covered by the gate insulating film 15 of the TFTs 14. The data lines DL are formed on the gate insulating film 15. The pixel electrodes 13 are formed on the gate insulating film (transparent film) 15 and one end of each of the pixel electrodes 13 is connected to each of the source electrodes S of the TFTs 14.

On the upper substrate (hereinafter called "opposite substrate") 12 a transparent opposite electrode 17 which faces the pixel electrodes 13 of the TFT substrate 11 is formed, as shown in FIG. 1. The opposite electrode 17 may consist of a single electrode or a plurality of divided electrodes, covering an entire display area.

Alignment films 18 and 19 are provided on electrode formation surfaces of the TFT substrate 11 and opposite substrate 12, respectively. These alignment films 18 and 19 are homogeneous alignment films made of an organic high molecular compound such as polyimide. An alignment film surface of the opposite substrate 12 is subjected to an aligning treatment by means of rubbing, whereas an alignment film surface of the TFT substrate 11 is not subjected to rubbing treatment. In an LCD device using anti-ferroelectric liquid crystal, aligning directions of liquid crystal molecules can satisfactorily be restricted only if the alignment film of at least one of the substrates 11 and 12 sandwiching the liquid crystal layer is provided with a function of restricting the orientation directions of liquid crystal molecules. Thus, one of the alignment films of the substrates may be a non-rubbed film having only a homogeneous alignment property, or the alignment films of both substrates may be rubbed in a predetermined direction.

The TFT substrate 11 and opposite substrate 12 are bonded to each other at their peripheral portions via a frame-shaped sealing member (not shown). An anti-ferroelectric liquid crystal 20 is sealed in a space surrounded by the sealing member between the substrates 11 and 12. The anti-ferroelectric liquid crystal 20 is the same one as is employed in a conventional anti-ferroelectric LCD device. The orientation state of the liquid crystal molecules changes between the aforementioned first, second and third stable states in accordance with an electric field.

Polarizing plates 21 and 22 are laminated on the outer surfaces of the substrates 11 and 12, respectively. The polarizing plates 21 and 22, like the conventional anti-ferroelectric LCD device, are arranged in a cross-Nicol arrangement so that their light transmission axes intersect with each other at substantially right angles. The transmission axis of one of the polarizing plates, e.g. the lower incidence-side polarizing plate 21 in FIG. 1, is substantially parallel to an orientation direction of the liquid crystal molecules in the third stable state (i.e. an average orientation direction in the entire liquid crystal layer).

Figure 3:
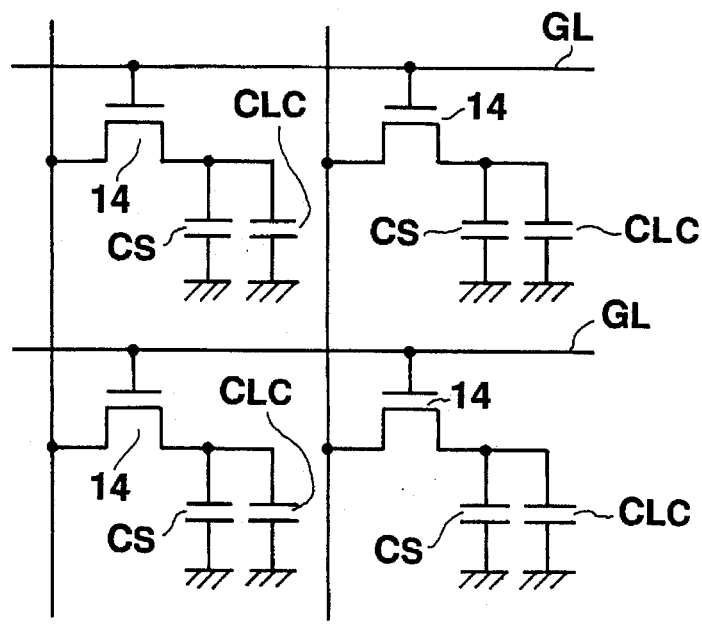
FIG. 3 is an electric equivalent circuit diagram of the anti-ferroelectric LCD device shown in FIG. 2.

FIG. 3 is an equivalent circuit diagram of the above-described anti-ferroelectric LCD device. A pixel constituted by a portion of the pixel electrode 13, a correspondingly opposing portion of the opposite electrode 17 and a portion of the liquid crystal 20 interposed between the both portions described above is equivalent to a capacitor. Thus, the pixel is expressed by a capacitance (hereinafter called "pixel capacitance") CLC. CS denotes a floating capacitance of the TFT 14 and the floating capacitance CS is coupled in parallel to the pixel capacitance CLC.

A display operation of this anti-ferroelectric LCD device is performed such that gate signals are successively applied to the gate lines GL and image data signals are applied to the data lines DL in correspondence to the apply of the gate signals.

Figure 4:
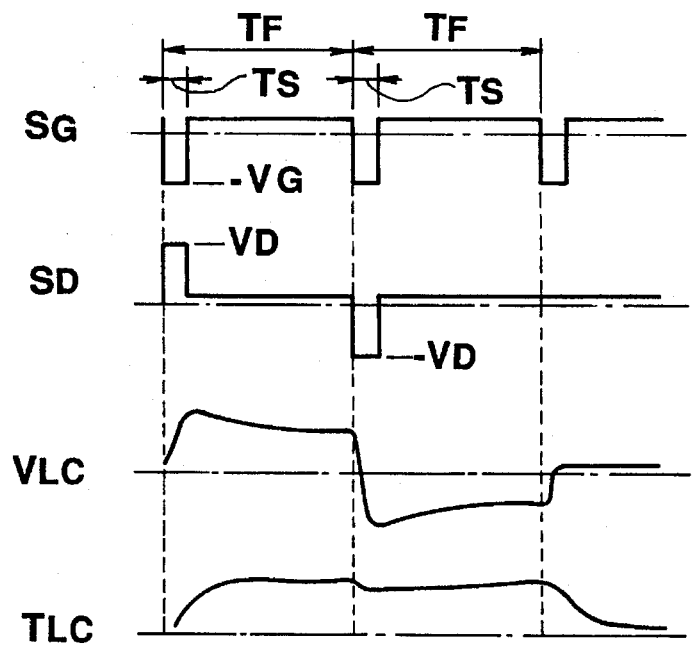
FIG. 4 is a timing chart showing waveforms of a gate signal and a data signal applied to one active element of the display device shown in FIG. 2, a waveform of a voltage applied to a liquid crystal, and a variation in light transmittance of the pixel in accordance with the voltage waveform.

FIG. 4 shows waveforms of a gate signal SG and a data signal SD applied to the TFT 14 of one pixel from the gate line GL and data line DL, a waveform of an 10 inter-electrode voltage VLC of the pixel, and a variation in the light transmittance TLC of the pixel. In FIG. 4, TS is a selection time period of the pixel, which is obtained by equally dividing one frame TF for displaying one screen by the number of rows of the pixel (i.e. the number of scan electrodes).

The display operation of the anti-ferroelectric LCD device will now be described. When a voltage −VG of the gate signal SG is applied to the gate electrode G of the TFT 14 during the selection time period TS, the TFT 14 is turned on and a charge corresponding to the voltage VD of the data signal SD supplied to the pixel via the TFT 14 from the data line DL is accumulated in the pixel (the pixel capacitance CLC and floating capacitance CS). In this case, the accumulation of charge in the pixel is performed quickly, and the inter-electrode voltage of the pixel (i.e. the voltage VLC across the pixel electrode 13 and opposite electrode 17) is set at a voltage corresponding to the potential difference between the gate signal −VG and data signal VD.

In a non-selection time period following the selection time period TS, application of the gate signal to the gate electrode G of the TFT 14 is stopped, and the TFT 14 is turned off. In the non-selection time period, the charge accumulated in the pixel (the pixel capacitance CLC and floating capacitance CS) is discharged. However, since the TFT 14 is turned off during the non-selection time period and the electrical connection between the pixel and the data line DL is cut off, discharge from the pixel during the non-selection time period is very small. Accordingly, a sufficient charge can be maintained in the pixel during the non-selection time period.

The anti-ferroelectric liquid crystal molecules are orientated in any of the stable states by an electric field according to the charge retained in the pixel. Since a sufficient charge is retained in the pixel during the non-selection time period, the orientation state of the liquid crystal molecules can be changed by the charge retained during the non-selection time period, although the speed of change of the liquid crystal molecular orientation state is slow.

According to the anti-ferroelectric LCD device, even if the response time of the anti-ferroelectric liquid crystal is long, it is not necessary to increase the selection time period. Thus, the selection time period for the pixel of each row can be decreased, and the frame frequency can be increased, so that a high time-sharing driving can be performed. In addition, since the orientation state of the liquid crystal molecules can surely be changed to the stable state, a high-contrast image can be achieved.

In the above LCD device, the alignment film 19 on the opposite substrate 12 on which the opposite electrode 17 is formed is the film being subjected to the rubbing treatment, and the alignment film 18 on the TFT substrate 11 on which the pixel electrodes 13 and associated active elements or TFTs 14 are formed is the non-rubbed film. Thus, during the manufacture of the LCD device, it is not necessary to subject the alignment film 18 on the TFT substrate 11 to the rubbing treatment, and therefore no static electricity due to the rubbing of the alignment film acts on the TFT substrate 11. Thus, the active elements (TFT) 14 are not destroyed by static electricity during manufacture, and the yield is increased.

In the above embodiment, TFTs (thin-film transistors) are used as active elements, but the active elements may be, e.g. thin-film diodes or the like.

[Second Embodiment]

A second embodiment of the invention will now be described with reference to FIGS. 6 and 7.

FIG. 6 is an exploded perspective view showing the structure of an anti-ferroelectric LCD device. Polarizing plates 121 and 122 are arranged on a light incidence side and light emission side of a liquid crystal cell 110 in which an anti-ferroelectric liquid crystal is sealed.

Figure 8:
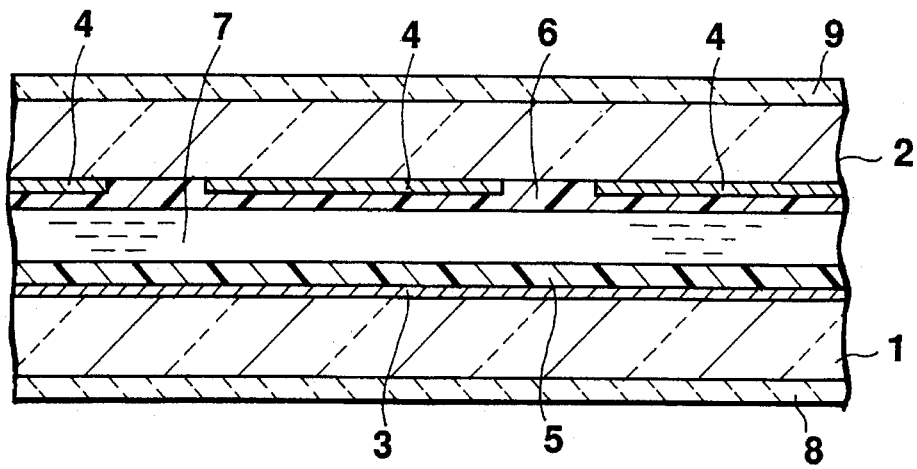
FIG. 8 is a cross-sectional view showing a part of a conventional, anti-ferroelectric LCD device.
Figure 9:
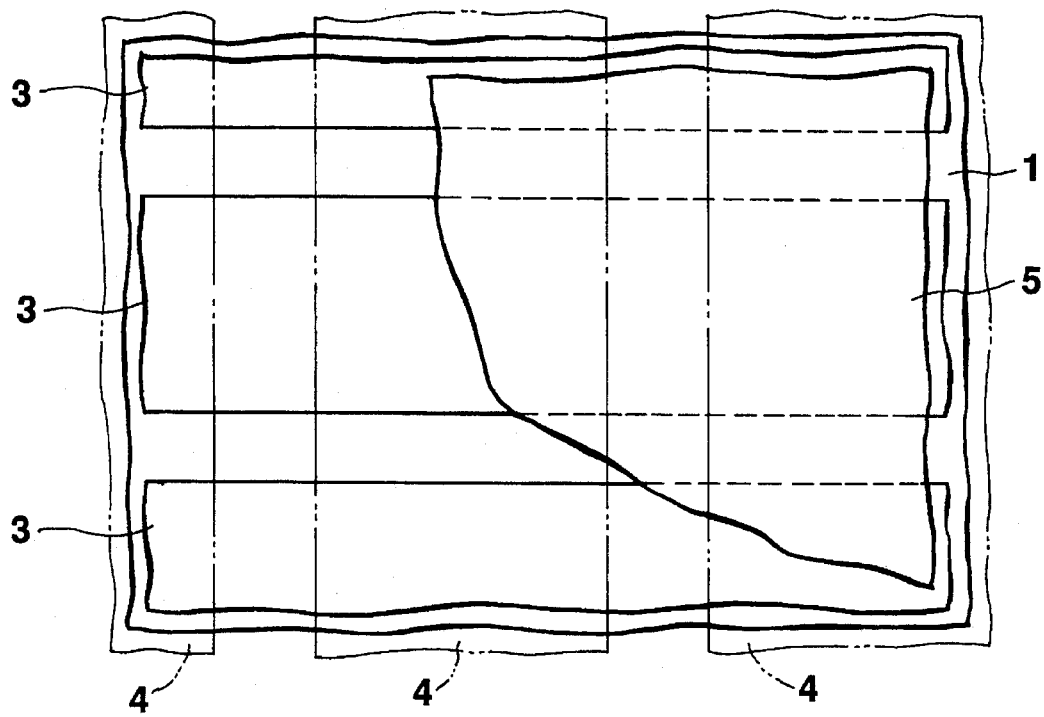
FIG. 9 is a plain view showing the part of the conventional display device shown in FIG. 8.
Figure 10:
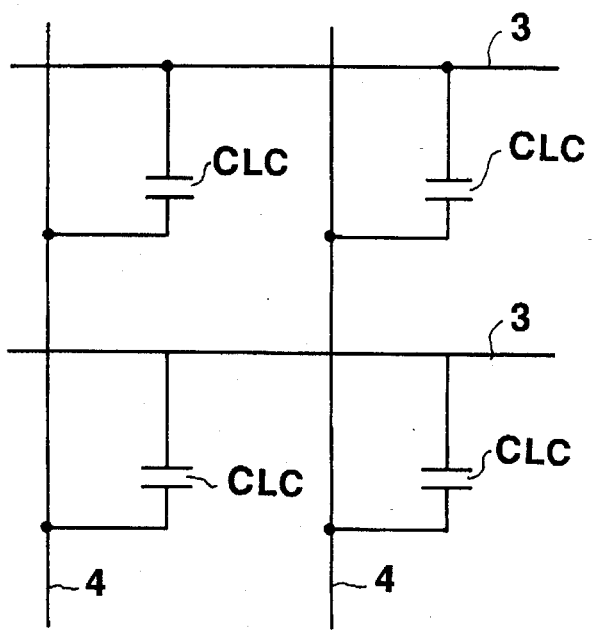
FIG. 10 is an electric equivalent circuit diagram of the conventional anti-ferroelectric LCD device.

The liquid crystal cell 110 is formed such that the same anti-ferroelectric liquid crystal (not shown) as in the first embodiment is sealed between a pair of transparent substrates 111 and 112 bonded to each other via a frame-shaped sealing member (not shown). Mutually facing surfaces of the substrates 111 and 112 are provided with, though not shown, the same pixel electrodes as in the first embodiment, or the same display transparent electrodes as shown in FIGS. 8 and 9 (e.g. scan electrodes and signal electrodes), and these mutually facing surfaces are subjected to an aligning treatment for restricting the normal direction of a smectic layer structure of the anti-ferroelectric liquid crystal.

In this embodiment, the aligning treatment is performed by forming homogeneous alignment films of polyimide or the like on the surfaces of the substrates 111 and 112 and rubbing the homogeneous alignment films, or laminating a plurality of single-molecular films of polyimide or the like on the surfaces of the substrates.

In FIG. 6, arrows 112a and 111a indicate aligning treatment directions (directions of rubbing or directions of alignment of single molecules) of both substrates 112 and 111. In this anti-ferroelectric LCD device, the aligning treatment direction 112a of the substrate 112 and the aligning treatment direction 111a of the substrate 111 are inclined relative to each other by a predetermined angle, and thereby the normal line L1 of the smectic layer structure restricted by the aligning treatment of the substrate 112 is made substantially parallel to the normal line L2 of the smectic layer structure restricted by the aligning treatment of the substrate 111.

It has conventionally been thought that the liquid crystal molecules of an anti-ferroelectric liquid crystal sealed between a pair of substrates are aligned such that a direction of a normal line of a smectic layer structure coincides substantially with the aligning treatment direction of the corresponding one of the alignment films provided on the substrates. However, in fact, the liquid crystal molecules are not aligned such that the normal line of the smectic layer structure coincides substantially with the aligning treatment direction of the corresponding one of the substrates, and the normal line of the smectic layer structure is inclined to the aligning treatment direction by a displacement angle. It has been found that the normal line of the smectic layer structure is displaced in one direction by an angle $\alpha 1$ with respect to the aligning treatment direction of the corresponding one of the substrates, and the normal line of the other smectic layer structure is displaced in the opposite direction by an angle $\alpha 2$ with respect to the aligning treatment direction of the corresponding other substrate. The value of angle $\alpha 1$ is substantially equal to the value of angle $\alpha 2$.

According to this anti-ferroelectric LCD device, the aligning treatment direction 112a of one substrate 112 is displaced by angle $\alpha 1$ in a direction opposite to the direction in which the normal line of the smectic layer structure is displaced from the aligning treatment direction on this substrate side. Similarly, the aligning treatment direction 111a of the other substrate 111 is displaced by angle α2 in a direction opposite to the direction in which the normal line of the smectic layer structure is displaced from the aligning treatment direction on this substrate side. Thereby, the normal line L1 of the smectic layer structure restricted by the aligning treatment of one substrate 112 is made substantially parallel to the normal line L2 of the smectic layer structure restricted by the aligning treatment of the other substrate 111.

FIG. 7 is a plan view showing the aligning treatment directions 112a and 111a of the substrates 112 and 111 of the liquid crystal cell 110, and the normal lines L1 and L2 of the smectic layer structure being adjacent to the substrates 112, 111 and respectively restricted by the aligning treatment of these substrates 112 and 111. When the aligning treatment directions 112a and 111a of both substrates 112 and 111 are determined as shown in FIG. 7, the normal line L1 of the smectic layer structure being adjacent to the other substrate 112 and restricted by the aligning treatment of the substrate 112 is displaced in one direction by the angle al from the aligning treatment direction 112a of the substrate 112, and the normal line L2 of the smectic layer structure being adjacent to the above described one substrate 111 and restricted by the aligning treatment of the substrate 111 is displaced in the opposite direction by angle α2 from the aligning treatment direction 111a of the substrate 111. Thus, the direction of the normal line L1 coincides with that of the normal line L2, as shown in FIG. 7, and the direction of the normal line of the smectic layer structure is made uniform in the entire thickness of the liquid crystal layer.

In FIG. 6, arrows 122a and 121a indicate the transmission axes of a pair of polarizing plates 122 and 121. In this anti-ferroelectric LCD device, the transmission axis 122a of one polarizing plate 122 is set in substantially parallel to or substantially at right angles with ("parallel" in FIG. 6) the normal line L1 of the smectic layer structure restricted by the aligning treatment of the substrate 112 associated with the polarizing plate 122. The transmission axis 121a of the other polarizing plate 121 is set substantially at right angles with the transmission axis 122a of the polarizing plate 122.

The display operation of this anti-ferroelectric LCD device will now be described. When no voltage or a low voltage is applied across the electrodes of both substrates 112 and 111 of the liquid crystal cell 110, the liquid crystal molecules are orientated in the third stable state shown in FIG. 5B (in which the average orientation direction of the liquid crystal molecules coincides with the direction of the normal line of the smectic layer structure) and the display is set in the OFF (dark) state.

In this case, in this anti-ferroelectric LCD device, the anti-ferroelectric liquid crystal molecules in the liquid crystal cell 110 are orientated such that the direction of the normal line of the smectic layer structure is uniform in the entire thickness of the liquid crystal. Thus, the direction of the liquid crystal molecules as viewed in the thickness direction of the liquid crystal layer (i.e. the direction perpendicular to the normal line of the smectic layer structure) is almost uniform along the entire thickness of the liquid crystal layer.

Regarding the pair of polarizing plates 122 and 121 arranged on the light incidence side and light emission side such that their transmission axes are substantially perpendicular to each other, the direction of transmission axis 122a of the incidence side polarizing plate 122 (upper polarizing plate in FIG. 6) is determined, as stated above, in accordance with the normal line L1 of the smectic layer structure restricted by the aligning treatment of the substrate 112 associated with the polarizing plate 122. Thus, linear-polarized light having a polarization direction substantially parallel to or perpendicular to the normal line L1 of the smectic layer structure is made incident on the liquid crystal layer. Accordingly, when the liquid crystal molecules are orientated in the third stable state, most of the incidence light emanates from the liquid crystal layer as such linear-polarized light and is absorbed by the emission-side polarizing plate 121. Therefore, leak light in the OFF state (i.e. in the third stable state of liquid crystal molecule orientation) is very small, as compared to the conventional anti-ferroelectric LCD device.

Figure 5A:
Figure 5B:

When an ON voltage of one-directional polarity is applied across the electrodes of the liquid crystal cell 110, the liquid crystal molecules are orientated in the first stable state shown in FIG. 5A (i.e. the state in which all liquid crystal molecules are uniformly orientated in one direction at a tilt angle θ to the normal line of the smectic layer structure).

In the first stable state, the orientation direction of the liquid crystal molecules is displaced from the polarization direction of the linear-polarized light incident on the liquid crystal layer (i.e. the direction substantially parallel or perpendicular to the normal direction of the smectic layer structure) by also the same angle as the aforementioned tilt angle. Thus, the linear-polarized light made incident on the liquid crystal layer is converted to elliptic-polarized light by a birefringence effect of the liquid crystal layer, and that component of the elliptic-polarized light, which emanates from the liquid crystal layer and travels along the transmission axis of the output-side polarizing plate 121 (the lower polarizing plate in FIG. 6), emanates from the liquid crystal device. Accordingly, the display is set in the ON (light) state.

This applies to the case where an ON voltage of opposite-directional polarity is applied across the electrodes of the liquid crystal cell 110. In this case, the liquid crystal molecules are orientated in the second stable state as shown in FIG. 5C (in which all liquid crystal molecules are uniformly orientated in a direction to the normal line of the smectic layer structure by a certain tilt angle but is opposed to the orientated direction in the first stable state). In the second stable state, too, the linear-polarized light made incident on the liquid crystal layer is converted to elliptic-polarized light by the birefringence effect of the liquid crystal layer, and that component of the elliptic-polarized light, which travels along the transmission axis 121a of the output-side polarizing plate 121, emanates from the liquid crystal device and the display is set in the ON (light) state.

Figure 11:
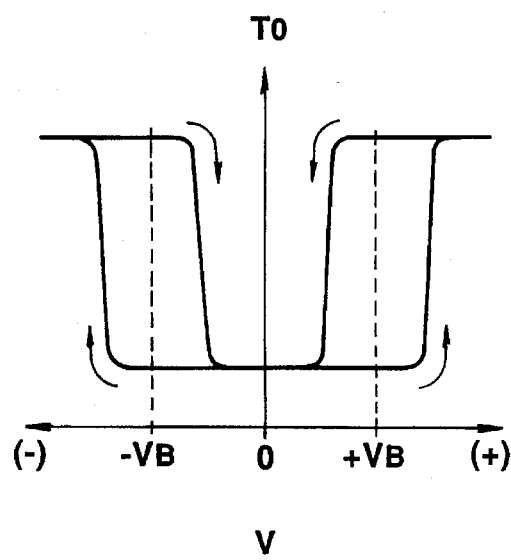
FIG. 11 is a characteristic diagram showing a variation of a light transmittance in relation to a voltage applied to the conventional anti-ferroelectric liquid crystal.
Figure 12:
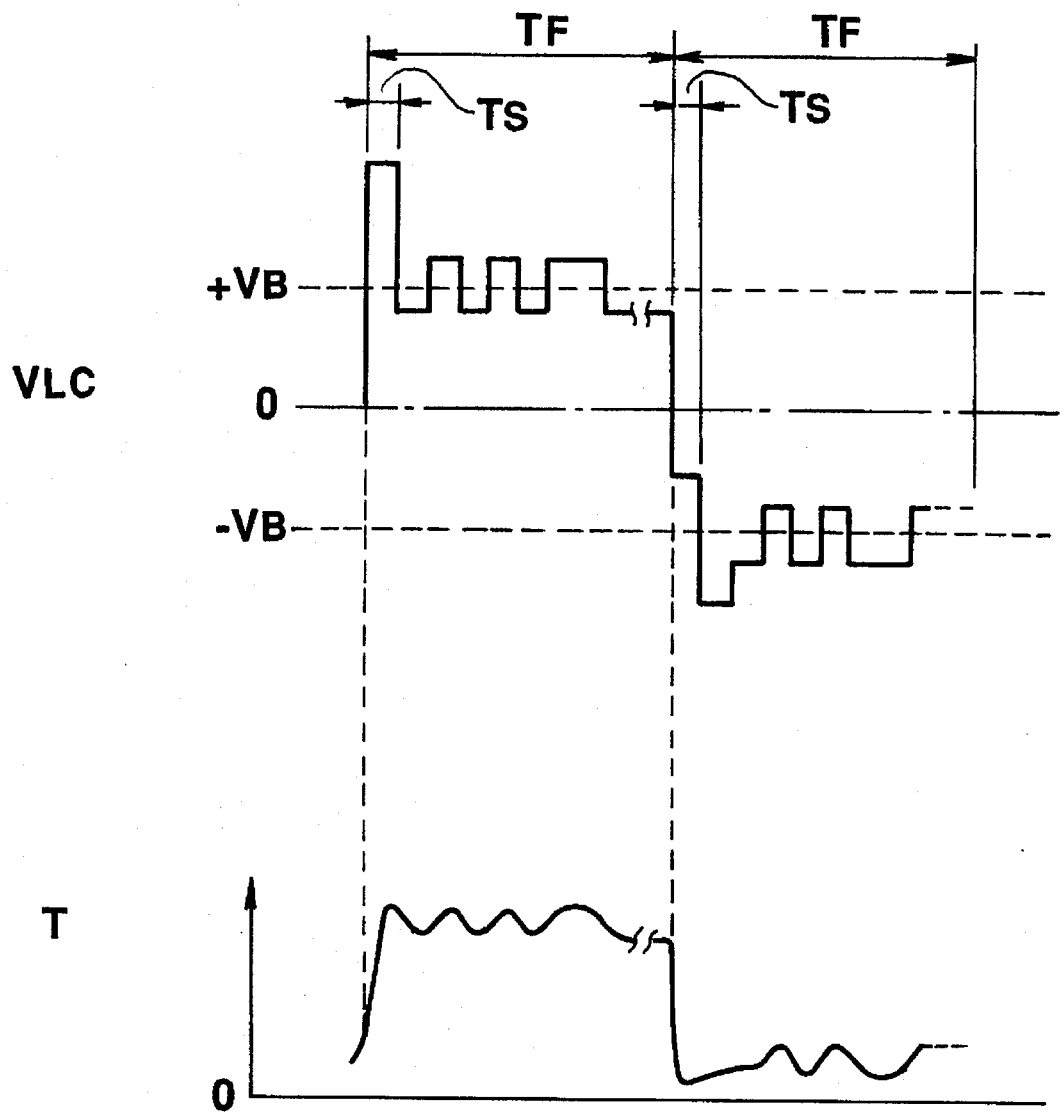
FIG. 12 is a timing chart showing a waveform of the voltage applied to a liquid crystal to activate the conventional anti-ferroelectric LCD device, and a variation in a light transmittance of a pixel in accordance with the voltage waveform.

The light transmittance varies, as shown in FIG. 11, in relation to the voltage applied to the liquid crystal of the anti-ferroelectric LCD device. When no voltage or a low voltage is applied across the electrodes of the liquid crystal 110, the display is in the OFF state. When the applied voltage is increased to the positive (+) side beyond a threshold value, the display is set in the ON state. When the applied voltage is decreased from the value in this state, below a certain threshold which is lower than the threshold value relating to the ON state, the display is returned to the OFF state. This applies to the case where the applied voltage is varied to the negative (−) side. In this case, too, when the absolute value of the applied voltage exceeds a certain threshold, the display is set in the ON state. When the absolute value of the applied voltage is decreased, from the value in this state, below a certain threshold relating to the ON state which is lower than the threshold value relating to the ON state, the display is returned to the OFF state.

Accordingly, when the LCD device of this embodiment having the simple matrix type electrodes is driven, voltage values +VB and −VB, which are almost the intermediate values between the voltage value at which the LCD device is set in the ON state and the voltage value at which the display device is returned to the OFF state, are employed as reference voltage values. By applying drive voltages, obtained by superposing image data signals on the reference voltages +VB and −VB, across the electrodes of the liquid crystal cell 10, images can be displayed on the LCD device.

As has been described above, according to this anti-ferroelectric LCD device, leak light in the OFF state is very small, as compared to the conventional anti-ferroelectric LCD device, and therefore display with good contrast can be achieved.

The second embodiment, like the first embodiment, is applicable to an active matrix type anti-ferroelectric LCD device. In this case, the aligning treatment direction of the alignment film 18 formed on the TFT substrate 11 and the aligning treatment direction of the alignment film 19 formed on the opposite substrate 12 in the first embodiment are displaced by angles α1 and α2 by aligning treatment, as in the second embodiment. Thereby, the normal line L2 of the smectic layer of the anti-ferroelectric liquid crystal aligned by the orientation restriction force of the alignment film 18 can be made substantially parallel to the normal line L1 of the smectic layer of the anti-ferroelectric liquid crystal aligned by the orientation restriction force of the alignment film 19. As a result, according to this anti-ferroelectric LCD device of the present invention, leak light in the OFF state can be reduced and high contrast can be achieved.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An anti-ferroelectric liquid crystal display device comprising:

a first substrate on which are mounted a plurality of first electrodes;

a second substrate which is arranged to face said first substrate with a predetermined gap therebetween, and on which second substrate is mounted at least one second electrode facing the first electrodes;

an anti-ferroelectric liquid crystal filled in the gap between said first substrate and said second substrate, said anti-ferroelectric liquid crystal being aligned in one of a first aligning stable state and a second aligning stable state in accordance with a direction of an electric field applied across the first electrodes and said at least one second electrode, and said anti-ferroelectric liquid crystal being capable of being aligned in a third aligning stable state;

a first alignment film covering surfaces of the first electrodes, and said first alignment film being subjected to a first aligning treatment in a first direction for aligning molecules of said anti-ferroelectric liquid crystal which are adjacent to said first alignment film in a predetermined direction, and for controlling a formation of a smectic layer of said anti-ferroelectric liquid crystal being adjacent to said first alignment film, whereby a direction of a normal line of the smectic layer differs from said first direction;

a second alignment film covering a surface of said at least one second electrode, and said second alignment film being subjected to a second aligning treatment in a second direction for aligning molecules of said anti-ferroelectric liquid crystal which are adjacent to said second alignment film in a predetermined direction, and for controlling a formation of a smectic layer of said anti-ferroelectric liquid crystal being adjacent to said second alignment film, the second direction intersecting the first direction at a predetermined angle so that the normal line of the smectic layer adjacent to said first alignment film is substantially parallel to the normal line of the smectic layer adjacent to said second alignment film, whereby said anti-ferroelectric liquid crystal is aligned uniformly in the third aligning stable state by the alignment restriction force of said first and second alignment films; and a sealing member bonding said first and second substrates to each other and sealing said anti-ferroelectric liquid crystal in the gap between said first and second substrates.

2. The device according to claim 1, wherein:

the first electrodes comprise stripe-shaped electrodes extending in rows or columns; and the at least one second electrode comprises stripe-shaped electrodes extending in columns or rows to cross and face the first electrodes.

3. The device according to claim 1, further comprising:

a pair of polarizing plates separately arranged on respective outer surfaces of said first and second substrates; and wherein:

one polarizing plate of the pair of polarizing plates has a light transmission axis which is arranged substantially parallel or perpendicular to the normal line of the smectic layer structure of said anti-ferroelectric liquid crystal; and the other polarizing plate of the pair of polarizing plates has a light transmission axis which is arranged substantially perpendicular to the light transmission axis of said one polarizing plate of the pair of polarizing plates.

4. The device according to claim 1, further comprising:

a plurality of active elements provided on the first substrate, each of the active elements being connected to the first electrodes to supply data signals to the first electrodes.

5. The device according to claim 4, wherein the active elements comprise thin-film transistors each having a drain electrode for receiving the data signals, a source electrode for supplying the data signals, and a gate electrode for controlling the supply of the data signals to the first electrodes.

6. The device according to claim 5, wherein each of the thin-film transistors includes amorphous silicon as a semiconductor.

7. The device according to claim 1, wherein the aligning treatments of said first and second alignment films comprise rubbing treatments on respective surfaces of said first and second alignment films.

8. An anti-ferroelectric liquid crystal display device comprising:

a first substrate on which a plurality of first electrodes are mounted;

a second substrate which is arranged to face said first substrate with a predetermined gap therebetween, and on which at least one second electrode is mounted to face said first electrodes;

an anti-ferroelectric liquid crystal filled in the predetermined gap between said first substrate and said second substrate, said anti-ferroelectric liquid crystal being aligned in one of a first orientation state in which average orientation direction of molecules of said anti-ferroelectric liquid crystal is orientated in a first orientation direction, a second orientation state in which average orientation direction of molecules of said anti-ferroelectric liquid crystal is orientated in a second orientation direction, and a third orientation state in which average orientation direction of molecules of said anti-ferroelectric liquid crystal is orientated in a third direction between said first and second orientation directions, in accordance with an electric field applied by said first electrodes and said at least one second electrode;

a first alignment film covering surfaces of said first electrodes, said first alignment film being subjected to a first aligning treatment in a first alignment direction for aligning molecules of said anti-ferroelectric liquid crystal which are adjacent to said first alignment film in a predetermined direction, and for controlling a formation of a smectic layer of said anti-ferroelectric liquid crystal being adjacent to said first alignment film, whereby a direction of a normal line of said smectic layer differs from said first alignment direction;

a second alignment film covering a surface of said at least one second electrode, said second alignment film being subjected to a second aligning treatment in a second alignment direction for aligning molecules of said anti-ferroelectric liquid crystal which are adjacent to said second alignment film in a predetermined direction, and for controlling a formation of a smectic layer of said anti-ferroelectric liquid crystal being adjacent to said second alignment film, said second alignment direction intersecting said first alignment direction at a predetermined angle so that said normal line of said smectic layer adjacent to said first alignment film is substantially parallel to said normal line of said smectic layer adjacent to said second alignment film, whereby smectic layer of said anti-ferroelectric liquid crystal between said first and second alignment films is aligned uniformly; and a sealing member bonding said first and second substrates to each other and sealing said anti-ferroelectric liquid crystal between said first and second substrates.

9. The device according to claim 8, wherein said electric field has a directivity corresponding to a voltage applied by said first and second electrodes, and wherein a direction of said electric field in said first orientation state differs from a direction of said electric field in said second orientation state.

10. The device according to claim 8, wherein an intensity of said electric field applied across said first and second electrodes in said third orientation state is zero or a value between that of an electrical field applied in said first and second orientation states.

* * * * *